United States Patent [19]

Higashinakagawa et al.

[11] Patent Number: 5,030,414
[45] Date of Patent: Jul. 9, 1991

[54] NUCLEAR FUEL ROD

[75] Inventors: Emiko Higashinakagawa, Kawasaki; Masao Yamamoto; Kazuhiko Machida, both of Tokyo, all of Japan

[73] Assignee: Kabushiki Kaisha Toshiba, Kawasaki, Japan

[21] Appl. No.: 292,952

[22] Filed: Jan. 3, 1989

[30] Foreign Application Priority Data

Jan. 7, 1988 [JP] Japan .................................. 63-000732

[51] Int. Cl.⁵ .............................................. G21C 3/00
[52] U.S. Cl. ..................................... 376/412; 376/414; 376/418; 376/420
[58] Field of Search ................. 376/414, 418, 420, 412

[56] References Cited

U.S. PATENT DOCUMENTS

| 4,065,352 | 12/1977 | Iwano et al. | 176/68 |
| 4,124,659 | 11/1978 | della Porta et al. | 264/0.5 |
| 4,234,385 | 11/1980 | Ozaki et al. | 176/68 |
| 4,871,509 | 10/1989 | Johansson | 376/412 |

Primary Examiner—Robert L. Stoll
Assistant Examiner—Nina Bhat
Attorney, Agent, or Firm—Foley & Lardner

[57] ABSTRACT

A nuclear fuel rod, in which a cladding tube contains fuel pellets therein and two plugs stop end openings of the cladding tube, in which a stopper member stops the fuel pellets from their moving through a spring member arranged between the stopper member and one of the plugs for biasing the stopper member onto the fuel pellets, and a getter tube is also arranged between the stopper member and the one of the plugs, and in which at least one of the spring member, the stopper member and the getter tube is made of a nonmagnetic steel.

4 Claims, 1 Drawing Sheet

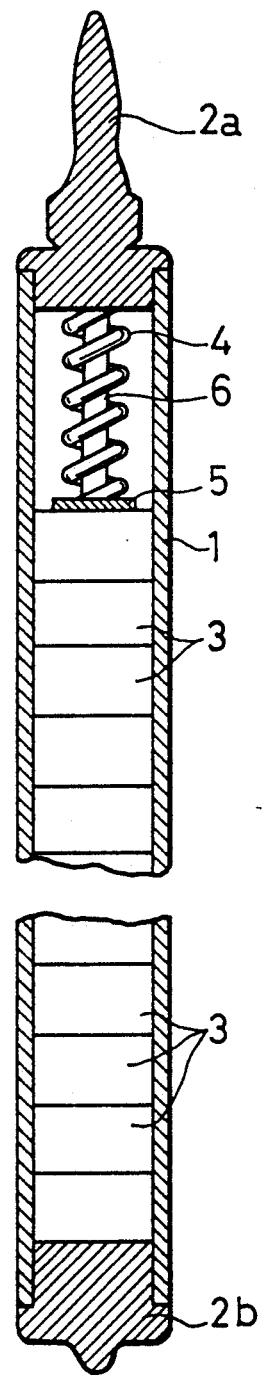

NUCLEAR FUEL ROD

BACKGROUND OF THE INVENTION

1. Field of the Invention

The present invention relates to a nuclear fuel rod of uranium dioxide pellets containing gadolinium oxide or gadolinia, filled up in a cladding tube.

2. Description of the Background Art

In a nuclear electric power generation, by burning uranium dioxide to generate heat, water is heated by the heat to generate steam of high temperature and a steam turbine is driven by the steam to produce electric power. In order to control a nuclear reaction, control rods are used, or gadolinium oxide or gadolinia for absorbing neutrons is admixed in uranium dioxide pellets to control the reaction, in particular, in its beginning step. The gadolinia is known as a flammable poison, and, once the gadolinia once absorbs the neutrons, its neutron-absorbing ability is gone. Thus, the gadolinia is essential for controlling the reaction speed in the beginning step. Usually, several number of nuclear fuel rods which are entirely or partially filled with pellets of uranium dioxide admixed with several percent of gadolinia, are used for each fuel assembly composed of 63 fuel rods.

In such a nuclear fuel rod, a cladding tube is made of a metallic material, e.g., a zirconium alloy such as Zircaloy-2 or the like, and contains uranium dioxide pellets, and upper and lower plugs stop the upper and lower openings of the cladding tube. In the cladding tube, a stopper plate for stopping the pellets and a spring for biasing the stopper plate onto the pellets are arranged. In some uranium dioxide pellets, usually, several percent of gadolinia is contained. A getter tube is also arranged between the upper plug and the uppermost pellet in the cladding tube, and a moisture getter is sealed within the getter tube. In this case, the structural members such as the spring, the stopper plate and the getter tube are made of a metallic material such as AISI 302 stainless steel or the like.

In general, structural members mounted in the nuclear reactor are carefully and severely inspected. The nuclear fuel rod is, of course, inspected after the fabrication, for instance, by passing it through a strong magnetic field of scores of thousands of gauss in a magnetic and passive scanner (MAPS) to inspect how many percent of gadolinia is contained in the uranium dioxide pellets. In such an inspection, since the structural members, i.e., the spring, the stopper plate and the getter tube are made of the stainless steel, as described above, they are usually magnetized to 100 to 200 gauss when passing through the strong magnetic field of scores of thousands of gauss, and their magnetization can be observed from the outside of the cladding tube. The magnetization of the spring, the stopper plate and the getter tube in the nuclear fuel rod brings about the following problems.

That is, in a long period of operation of the nuclear reactor, suspended materials such as hematite, magnetite and the like are produced in water, and the suspended materials contact with and attach onto the outer surface of the nuclear fuel rod as clads to cover the surface of the nuclear fuel rod. This covering of the nuclear fuel rod prevents the heat conduction or transference of the nuclear fuel rod to increase the temperature of the cladding tube of the nuclear fuel rod and thus to accelerate corrosion of the cladding tube. The magnetite of the suspended materials is an iron oxide having magnetic property, and hence, when the parts such as the spring, the stopper plate and the getter tube in the nuclear fuel rod are magnetized, the magnetite is much more liable to attach to the surface of the nuclear fuel rod, resulting in the remarkable acceleration of the corrosion of the cladding tube.

SUMMARY OF THE INVENTION

Accordingly, it is an object of the present invention to provide a nuclear fuel rod, free from the aforementioned disadvantages and defects of the prior art, which is capable of preventing an attachment of suspended materials or clads onto the nuclear fuel rod, improving heat conduction or transference of the nuclear fuel rod, and preventing corrosion thereof.

In accordance with one aspect of the present invention, there is provided a nuclear fuel rod, comprising a cladding tube for containing fuel pellets therein, two plugs for stopping end openings of the cladding tube, a stopper member for stopping the fuel pellets from their moving, a spring member arranged between the stopper member and one of the plugs for biasing the stopper member onto the fuel pellets, and a getter tube arranged between the stopper member and the one of the plugs, at least one of the spring member, the stopper member and the getter tube being of a nonmagnetic steel.

The above and other objects, features and advantages of the present invention will be more apparent from the description of the preferred embodiments of the present invention.

BRIEF DESCRIPTION OF THE DRAWING

The figure shows a longitudinal cross sectional view of one embodiment of a nuclear fuel rod according to the present invention.

DESCRIPTION OF THE PREFERRED EMBODIMENTS

The present invention will now be described in detail in connection with its preferred embodiment with reference to the accompanying drawing.

In the figure, there is shown one embodiment of a nuclear fuel rod according to the present invention. The nuclear fuel rod comprises a cladding tube 1 for containing uranium dioxide pellets 3 therein, made of a metallic material of a zirconium alloy such as Zircaloy-2 or the like, a pair of upper and lower plugs 2a and 2b for stopping the upper and lower openings of the tube 1, and a stopper plate 5 for stopping the pellets 3 contained in the tube 1 from their moving up, through a spring 4 arranged between the upper plug 2a and the stopper plate 5 for biasing the stopper plate 5 onto the pellets 3. In some or at least one uranium dioxide pellets 3, usually, several percent of gadolinia is contained. Further, a getter tube 6 is arranged between the upper plug 2a and the uppermost pellet 3, and a moisture getter is sealed within the getter tube 6.

In this embodiment, the structural members such as the spring, the stopper plate and the getter tube may be made of a nonmagnetic steel which is prepared by a heat treatment of a stainless steel essentially consisting of 3.5 to 15% by weight of nickel (Ni), 16 to 19% by weight of chromium (Cr), at most 0.15% by weight of carbon (C), at most 1.0% by weight of silicon (Si), at most 10.0% by weight of manganese (Mn), at most 0.2% by weight of phosphor (P), at most 0.15% by weight of sulfur (S), inevitable impurities and the remaining balance of iron (Fe), as hereinafter described in detail.

A stainless steel such as AISI 201, AISI 202, AISI 301, AISI 302, AISI 303, AISI 304, AISI 304L, AISI 305, AISI 316, AISI 316L and the like, whose details are defined by the ASTM, may be used as a starting material for preparing the nonmagnetic steel.

For instance, in brief, a structural member made of one of the above described stainless steel is processed by hardening, and martensite resulting from the hardening is then converted into austenite by heating at a temperature of 500° to 1100° C. under reduced pressure to obtain a nonmagnetic steel. As to the ratio of the austenite in the nonmagnetic steel, at least 90% by weight is preferable, at least 95% is more preferable, and at least 98% is most preferable. The heat treatment temperature is preferably approximately 500° to 1100° C., and more preferably approximately 750° to 1000° C. The magnetic permeability of the nonmagnetic steel is preferably at most 1.2, more preferably at most 1.1, and most preferably at most 1.02.

Examples of the present invention will now be described in detail along with a Comparative Example.

EXAMPLE 1

First, the magnetic strength of structural members such as a spring, a stopper plate and a getter tube made of a stainless steel essentially consisting of 9.0% by weight of Ni, 18% by weight of Cr, 0.13% by weight of C, 0.8% by weight of Si, 1.0% by weight of Mn, 0.02% by weight of P, 0.01% by weight of S and the remaining balance of Fe was measured by a gauss meter to obtain zero gauss. Then, the structural members were treated at a temperature of 800° C. under reduced pressure of $5 \times 10^{-5}$ mm Hg for 10 minutes, and then were cooled to degauss them. Then, the degaussed structural members were fixed to a nuclear fuel rod having an outer diameter of 12.5 mm and a length of 40 cm, shown in the Figure. Now, in order to measure and inspect the amount of the gadolinia contained in the pellets within the nuclear fuel rod, the nuclear fuel rod was passed through a magnetic field of 70 thousands of gauss in a magnetic and passive scanner (MAPS), and then the magnetic strength of the structural members in the nuclear fuel rod was measured from its outside at the corresponding positions to the structural members to obtain a value of naught.

EXAMPLE 2

A magnetic strength of structural members such as a spring, a stopper plate and a getter tube made of a stainless steel essentially consisting of 9.0% by weight of Ni, 19.0% by weight of Cr, 0.04% by weight of C, 0.7% by weight of Si, 1.0% by weight of Mn, 0.02% by weight of P, 0.01% by weight of S and the remaining balance of Fe was measured by a gauss meter to obtain zero gauss. Then, the structural members were treated at a temperature of 850° C. under reduced pressure of $5 \times 10^{-5}$ mm Hg for 8 minutes, and then were cooled to degauss them. Then, the degaussed structural members were fixed to a nuclear fuel rod having an outer diameter of 12.5 mm and a length of 40 cm, shown in the Figure. Now, in order to measure and inspect the amount of the gadolinia contained in the pellets within the nuclear fuel rod, the nuclear fuel rod was passed through a magnetic field of 70 thousands of gauss in the MAPS, and then the magnetic strength of the structural members in the nuclear fuel rod was measured from its outside at the corresponding positions to the structural members to obtain a value of naught.

COMPARATIVE EXAMPLE 1

The structural members having the magnetic strength of zero gauss were directly fixed to a nuclear fuel rod of the same type as the one of Example 1, without having conducted the heat treatment of the structural members. Then, the nuclear fuel rod was treated and the magnetic strength of the structural members were measured in the same manner as Example 1 to obtain 20 gauss.

Then, a corrosion test of the nuclear fuel rods of the above Examples and Comparative Example will be described.

Firstly, 4000 ml of water, 50 g of hematite ($\alpha$-$Fe_2O_3$), 5 g of copper oxide ($CuO$) and 1 g of magnetite ($Fe_3O_4$) powder were put into a steam generator while the nuclear fuel rods of the Examples and Comparative Example were set in a corrosion tester which was coupled to the steam generator via a valve. Then, the steam generator was heated to keep its temperature at 300° C. so as to introduce the generated steam into the corrosion tester while the corrosion tester was maintained at a temperature of 500° C. under a high pressure of 105 kg/cm$^2$. After 24 hours of treatment, the conditions of the nuclear fuel rods were inspected to obtain the following results. That is, no suspended material or clad comprised of hematite as a main component attaches on the nuclear fuel rod of the Examples of the present invention while clads attach onto an entire peripheral surface area of the nuclear fuel rod of the Comparative Example corresponding to the structural members fixed in the nuclear fuel rod. Further, when the clads were removed from the nuclear fuel rod of the Comparative Example, it was confirmed that the oxidation on its surface was accelerated, as compared with the nuclear fuel rod of the Examples of the present invention.

As described above, since structural members such as a spring, a stopper plate and a getter tube in a nuclear fuel rod are made of a nonmagnetic steel, even when the nuclear fuel rod is passed through a strong magnetic field for inspecting an amount of gadolinia contained in uranium dioxide pellets, the magnetization of the structural members can be naught at the surface of the nuclear fuel rod, and the attaching of the suspended material or clads on the surface of the nuclear fuel rod in the water of the nuclear reactor can be effectively prevented. Hence, the corrosion of the surface of the nuclear fuel rod can be largely improved to obtain the nuclear fuel rod having high reliability.

Although the present invention has been described in its preferred embodiment with reference to the accompanying drawings, it is readily understood that the present invention is not restricted to the preferred embodiments and that various changes and modifications may be made in the present invention by a person skilled in tha art without departing from the spirit and scope of the present invention.

What is claimed is:

1. A nuclear fuel rod, comprising:
    a cladding tube for containing fuel pellets therein, said cladding tube having end openings;
    two plugs for stopping the end openings of the cladding tube;
    a stopper member for stopping the fuel pellets from moving within the cladding tube;

a spring member arranged between the stopper member and one of the plugs for biasing the stopper member onto the fuel pellets; and a getter tube arranged between the stopper member and the one of the plugs, wherein at least one of the spring member, the stopper member and the getter tube comprises a nonmagnetic steel.

2. The rod of claim 1, wherein the nonmagnetic steel comprises at least 90% by weight of austenite.

3. The rod of claim 1, wherein the nonmagnetic steel has a magnetic permeability of at most 1.2.

4. The rod of claim 1, wherein the nonmagnetic steel comprises a stainless steel heat-treated at a temperature of 500° to 1100° C. consisting essentially of 3.5 to 15% by weight nickel, 16 to 19% by weight chromium, at most 0.15% by weight carbon, at most 1.0% by weight silicon, at most 10.0% by weight manganese, at most 0.2% by weight phosphor, at most 0.15% by weight sulfur and the remaining balance of iron.

* * * * *